US011650856B2

(12) United States Patent
Chen

(10) Patent No.: US 11,650,856 B2
(45) Date of Patent: May 16, 2023

(54) FEDERATED OPERATOR FOR EDGE COMPUTING NETWORK

(71) Applicant: Red Hat, Inc., Raleigh, NC (US)

(72) Inventor: Huamin Chen, Westborough, MA (US)

(73) Assignee: RED HAT INC., Raleigh, NC (US)

(*) Notice: Subject to any disclaimer, the term of this patent is extended or adjusted under 35 U.S.C. 154(b) by 315 days.

(21) Appl. No.: 16/913,101

(22) Filed: Jun. 26, 2020

(65) Prior Publication Data
US 2021/0406088 A1    Dec. 30, 2021

(51) Int. Cl.
| | | |
|---|---|---|
| G06F 9/46 | (2006.01) | |
| G06F 9/50 | (2006.01) | |
| G06F 9/54 | (2006.01) | |
| G06F 21/44 | (2013.01) | |
| G06F 21/60 | (2013.01) | |
| H04L 67/568 | (2022.01) | |

(52) U.S. Cl.
CPC .......... *G06F 9/5077* (2013.01); *G06F 9/5011* (2013.01); *G06F 9/547* (2013.01); *G06F 21/44* (2013.01); *G06F 21/602* (2013.01); *H04L 67/568* (2022.05); *G06F 2209/505* (2013.01)

(58) Field of Classification Search
CPC ...... G06F 9/5077; G06F 9/5011; G06F 9/547; G06F 21/44; G06F 21/602; G06F 2209/505; H04L 67/568
USPC .......................................................... 718/104
See application file for complete search history.

(56) References Cited

U.S. PATENT DOCUMENTS

| | | | |
|---|---|---|---|
| 10,705,945 B1* | 7/2020 | Stickle | G06F 9/5061 |
| 10,922,284 B1* | 2/2021 | Venkatasubramanian | H04L 61/4523 |
| 11,093,293 B2* | 8/2021 | Matus | H04L 43/0817 |
| 2018/0167277 A1* | 6/2018 | Mahimkar | H04L 41/082 |
| 2019/0213046 A1* | 7/2019 | Matus | G06F 9/5061 |
| 2020/0151023 A1* | 5/2020 | Bai | H04L 41/0893 |

(Continued)

FOREIGN PATENT DOCUMENTS

| | | | | |
|---|---|---|---|---|
| CN | 111625224 A | * | 9/2020 | G06F 8/24 |
| EP | 3929741 A1 | * | 12/2021 | G06F 21/44 |

OTHER PUBLICATIONS

English Translation of CN-111625224-A (Year: 2020).*

(Continued)

*Primary Examiner* — Bradley A Teets
(74) *Attorney, Agent, or Firm* — K&L Gates LLP

(57) ABSTRACT

Systems and methods for inter-cluster deployment of compute services using federated operator components are generally described. In some examples, a first request to deploy a compute service may be received by a federated operator component. In various examples, the federated operator component may send a second request to provision a first compute resource for the compute service to a first cluster of compute nodes. In various examples, the first cluster of compute nodes may be associated with a first hierarchical level of a computing network. In some examples, the federated operator component may send a third request to provision a second compute resource for the compute service to a second cluster of compute nodes. The second cluster of compute nodes may be associated with a second hierarchical level of the computing network that is different from the first hierarchical level.

19 Claims, 10 Drawing Sheets

(56) References Cited

U.S. PATENT DOCUMENTS

2021/0255885 A1\* 8/2021 Purohit .................. G06F 3/067
2021/0360500 A1\* 11/2021 Mehta ................. H04L 41/0806

OTHER PUBLICATIONS

Ilie et al., "On designing a cost-aware virtual CDN for the federated cloud", 2016 (Year: 2016).\*
Kim et al., "TOSCA-Based and federation-Aware Cloud Orchestration for Kubernetes Container Platform", 2019 (Year: 2019).\*
Author Unknown; Kubernetes—Why federation?; Devopspoints; 2020; 4 pgs.
Dobies et al.; Kubernetes Operators Automating the Container Orchestration Platform; Jan. 13, 2020; 155 pgs; O'Reilly Media, Inc.; Sebastopol, CA, USA.

\* cited by examiner

FEDERATED OPERATOR FOR EDGE COMPUTING NETWORK

BACKGROUND

The present disclosure generally relates to shared computing environments such as multi-tenant cloud environments. Specifically, shared computing environments, whether public or privately implemented within an organization, typically employ orchestration of the deployment of isolated guests that perform the computing tasks in the networked computer systems. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications, and may be deployed in a variety of hardware environments. Multiple guests may also be clustered together to perform a more complex function than the respective containers are capable of performing individually. Many applications require persistent storage to store a current execution state and therefore persistent storage may be provisioned and allocated to the guests executing in a computing environment.

SUMMARY

The present disclosure provides a new and innovative system, methods and apparatus for deployment and maintenance of compute services across multiple container orchestration clusters. In an example, a memory is configured in communication with at least one processor. The at least one processor may be configured to execute a federated operator component. The federated operator component, in turn, may be effective to receive an application programming interface (API) declaration specifying a compute service, a first compute resource requirement for the compute service, and a second compute resource requirement for the compute service. The federated operator component may send a first request to provision a first compute resource according to the first compute resource requirement to a first operator component executing on a first container orchestration framework of a first cluster of compute nodes. In some examples, the first cluster of compute nodes may be associated with a first hierarchical level of a computing network. The federated operator component may be further configured to send a second request to provision a second compute resource according to the second compute resource requirement to a second operator component executing on a second container orchestration framework of a second cluster of compute nodes. In some examples, the second cluster of compute nodes may be associated with a second hierarchical level of the computing network that is different from the first hierarchical level.

In another example, a memory is configured in communication with at least one processor. A first operator component is associated with a first container orchestration framework of a first cluster of compute nodes. A first cluster resource delegate is associated with the first cluster of compute nodes. The first cluster resource delegate may be configured to receive first instructions from a federated operator component configured in communication with a plurality of operator components. The first instructions may include a request to provision a first compute resource for a first compute service. In some examples, each operator component of the plurality of operator components may be associated with a respective cluster of compute nodes. In various further examples, the first compute service may use a second compute resource provisioned by a second cluster of compute nodes. In some examples, the first cluster resource delegate may be configured to generate modified instructions by modifying the first instructions to correspond to an application programming interface (API) specific to the first operator component. In some examples, the first operator component may be configured to receive, at the API, the modified instructions. In some further examples, the first operator component may send second instructions to a master node of the first container orchestration framework to instantiate one or more containers configured to provide the first compute resource for the first compute service based on the modified instructions.

In yet another example, a method of providing a compute service may include receiving, at a first application programming interface (API) of a federated operator component, a first request to deploy a compute service. A federated operator component may send a second request to provision a first compute resource for the compute service among a first cluster of compute nodes to a first operator component associated with the first cluster of compute nodes. In some examples, the first cluster of compute nodes may be associated with a first hierarchical level of a computing network. In various further examples, the federated operator component may send a third request to provision a second compute resource for the compute service among the second cluster of compute nodes to a second operator component associated with a second cluster of compute nodes. In some examples, the second cluster of compute nodes may be associated with a second hierarchical level of the computing network that is different from the first hierarchical level.

Additional features and advantages of the disclosed method and apparatus are described in, and will be apparent from, the following Detailed Description and the Figures.

DETAILED DESCRIPTION OF EXAMPLE EMBODIMENTS

Figure 1:
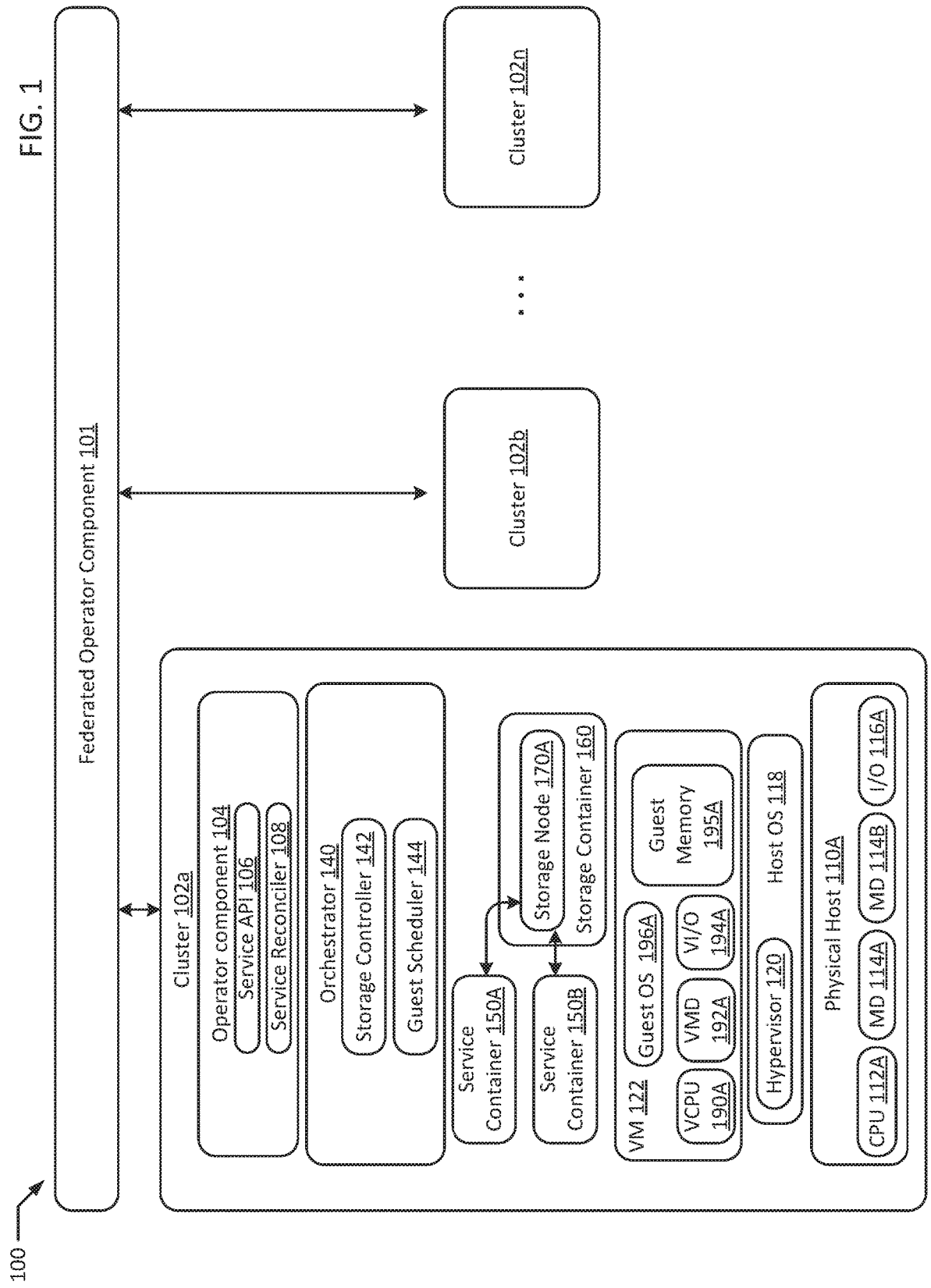
FIG. 1 is a block diagram of a federated operator compute service system according to an example of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®, Docker Swarm®), generally respond to frequent container startups and cleanups with low latency. Containers may enable wide spread, parallel deployment of computing power for specific tasks. In a typical example, a container may be instantiated to process a specific task and reaped after the task is complete.

Compute services, such as content delivery networks (CDNs), Video Analytics as a Service, Retail as a Service, and other compute services are often deployed across a multitude of compute nodes. Each service may have different compute resource requirements such as compute capacity, network latency, cache and storage requirements, etc. Traditionally, compute resources for a compute service are deployed within a single cluster of compute nodes. A cluster of compute nodes, as used herein, refers to compute nodes on which an orchestration framework has been deployed (e.g., Kubernetes®, Docker Swarm®, etc.). Compute resources are typically deployed on a single cluster for security reasons, as clusters typically are not authenticated to one another. In a cloud-computing paradigm where applications and services are all deployed at a centralized location there is typically no advantage to deploying compute services across different clusters. However, in edge computing, where computing resources are provisioned at different tiers and at different geographically distributed nodes it may be advantageous to deploy different compute resources at different hierarchical levels of the edge network in order to optimize compute footprint and/or performance. Deployment of compute services across multiple clusters in an edge network may allow for more efficient use of compute resources and may provide better service and/or lower latency relative to deployment within a single, centralized cluster. However, due to a typical lack of trusted communication between clusters and due to the lack of inter-cluster resource management, such inter-cluster compute architectures have not been deployed in a highly scalable and efficient way.

For example, in edge computing, it may be advantageous to deploy different compute resources at different tiers and/or geographically distributed nodes. For example, it may be advantageous, from a latency perspective, to provision cache for a content delivery network in a cluster that is geographically proximate to a consumer of the data. By contrast, it may be advantageous to deploy persistent storage at a higher tier so that, in the event of a failure of the cluster on which the cache is deployed, the data may be retrieved from persistent storage. However, as previously described, compute services are typically not deployed across multiple clusters due to security and trust issues. Accordingly, described herein are federated operator components that are configured to communicate with operator components executing on different clusters at different hierarchical levels (e.g., at different geographical locations and/or at different levels of organization) of an edge computing network. The federated operator components are configured to deploy compute services by provisioning compute resources across different clusters, with each cluster being associated with an orchestration framework and operator component. Additionally, the federated operator components deploy inter-cluster access credentials and/or authentication data (e.g., usernames, passwords, signed security certificates, etc.) to the different clusters in order to enable secure communications between different clusters to enable compute resources of a single compute service that are deployed on different clusters to communicate. Further, the federated operator component is able to balance/re-balance compute resource deployment according to the current state of the compute service/network and according to service level agreements (SLAs) associated with the compute service. During re-balancing (and more generally to enable inter-cluster communication) the federated operator component may define an inter-service and/or inter-cluster service mesh networks. A service mesh network may be a connectivity map that allows nodes of different clusters to communicate with one another by maintaining and updating routing tables translating between virtual addresses and physical addresses of compute resources among different clusters. The federated operator component can perform access control, circuit breaking, quality of service (QoS), etc. Federated operator components may also maintain session affinity. In various examples, federated operator components may be deployed at a hierarchical level that is at least one level higher than clusters upon which the federated operator provisions compute resources used by a cross-cluster distributed compute service, in order to maintain communication and/or control over the various compute resources comprising the compute service.

In addition, federated operator components may perform resource scaling across all tiers of edge computing clusters according to current SLAs. In some examples, federated operator components may provide policies for system/component upgrade and/or maintenance globally across all tiers of edge computing clusters. For example, the federated operator component may implement a CDN upgrade policy that triggers update of cache services on Edge Clusters A and B only after successful update of a Storage Service cluster. Federated control of upgrade and/or maintenance policies may help to ensure service availability during maintenance. Additionally, federated operator components may provision a global level domain name service (DNS) resolution and service discovery. When a compute service is orchestrated, the federated operator component may track the service's DNS records and service location. For example, the DNS records and service location may be tracked in an API declaration's status field.

Operator components (sometimes referred to as "operators") are software executing on a cluster of compute nodes that manage an orchestration environment and use the current state of the environment to make decisions about compute resource deployment/balancing/maintenance in real time. For example, operator components upgrade systems, react to failures, deploy applications and/or application services, etc. Operators communicate with the master node of the orchestration framework to take actions within the cluster. Compute resource definitions may be specified to an operator component as an application programming interface (API) declaration. The operator component may provide the compute resource definitions to a reconciler component that communicates with the master node to provision the declared compute resource(s) on nodes of the cluster.

FIG. 1 is a block diagram of a federated operator compute service system according to an example of the present disclosure. The system 100 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refers to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, storage container 160 and/or service containers 150A, 150B are similarly implemented. In an example, orchestrator 140 may be hosted on one or more guests, for example, a service container similar to service containers 150A-B and orchestrator 140 may be a virtualization orchestrator (e.g., Red Hat® OpenShift®, Kubernetes®) managing virtual compute resources for system 100. In some examples, orchestrator 140 may represent a master node of a cluster 102a of compute nodes on which a container (or other trusted execution environment) framework is deployed. In some examples, orchestrator 140 may include guest scheduler 144 for containers and/or VMs, network storage management (e.g., storage controller 142), API management etc. In an example, orchestrator 140 is implemented via a cluster 102a of containers instead of in a single container. In an example, storage controller 142 may be a storage cluster orchestrator (e.g., Rook®) managing the deployment of a distributed storage solution (e.g., Red Hat® Ceph®, OpenStack® Swift, Amazon S3®, etc.) that may additionally employ a distributed file system (e.g., Red Hat® GlusterFS®). In an example, storage controller 142 and/or guest scheduler 144 may be component parts of orchestrator 140. In another example, storage controller 142 and/or guest scheduler 144 may be external components in communication with orchestrator 140, for example, through an application programming interface ("API"). In an example, any form of suitable network for enabling communications between computing devices, for example, a public network (e.g., the Internet), a private network (e.g., a local area network (LAN) or wide area network (WAN)), or a combination thereof may be employed to connect the component parts of the system (e.g., orchestrator 140, storage container 160, service containers 150A-B, etc.) to each other. In an example, orchestrator 140, storage controller 142, and/or guest scheduler 144 may be implemented via any suitable form of computing module (e.g., application, executable, script, hardware module, etc.). Although not shown in FIG. 1, other clusters 102b, . . . , 102n of compute nodes may similarly deploy respective orchestrators 140 to deploy virtualized and/or distributed compute services on different nodes of the respective clusters 102b, . . . , 102n. As described in further detail below, a federated operator component 101 may communicate with clusters 102a, 102b, . . . , 102n and may deploy and manage compute services across multiple clusters. In addition, federated operator component 101 may define a mesh network for routing inter-cluster communication to enable compute resources that are part of the same compute service, but which are deployed on different clusters, to communicate with one another. Additionally, to ensure trusted and/or secure communication federated operator component 101 may obtain access credentials and/or signed security certificates and may provision such credentials to different clusters to enable inter-cluster communication.

In an example, in addition to distributed storage provided by storage container 160, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, storage controller 142 may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across clusters 102a, 102b, . . . , 102n. In various examples, federated operator component 101 may send requests to operators (e.g., operator component 104, etc.) executing on the respective clusters 102a, 102b, . . . , 102n, to request provisioning of a particular compute resource that is part of a compute service that is distributed across different clusters.

As described in further detail below, clusters 102a, 102b, . . . , 102n may be organized into different hierarchical levels and/or may be deployed at various different geographical locations. For example, in an edge computing network, various clusters of compute nodes may be deployed at the far edge (e.g., on site at an institution and/or proximate to the data/service consumer), various other clusters may be regionally deployed (e.g., at a particular geographic region that is at a higher hierarchical level relative to far edge clusters), and/or more centrally deployed (e.g., at a higher hierarchical level relative to both far edge clusters and regional clusters).

Operator components (including operator component 104 executing on cluster 102a) may be software executing on each of the clusters 102a, 102b, . . . , 102n. The operator components may manage the underlying orchestration frameworks of their respective clusters and make decisions concerning compute resource deployment/balancing/maintenance based on current state data of the orchestration environment. In an example, operator component 104 may receive an API declaration specifying one or more compute resources to be deployed by cluster 102a as part of a compute service. The API declaration may specify the parameters of the compute resource and/or SLAs of the compute resource. The operator component 104 may communicate with the underlying orchestrator 140 (e.g., the cluster's master node) in order to deploy the compute resource specified by federated operator component 101. Although the various components of a compute service that is deployed across multiple clusters are referred to herein as "compute resources," it should be appreciated that each of the compute resources could instead be referred to as a "compute service" (e.g., a caching service, network service, etc.) that is a sub-service of the larger, distributed compute service (e.g., a CDN).

In an example, the operator component 104 may specify the particular resource and related resource requirements at service API 106. A service reconciler 108 may, in turn, determine how the specified resource should be deployed and/or provisioned on the cluster 102a. The service reconciler 108 may communicate with the orchestrator 140 (e.g., with the master node of cluster 102a) to deploy the compute resource via one or more containers provisioned on one or more of the compute nodes of the cluster 102a. The service reconciler 108 may include logic that may determine, based on the API declaration received from service API 106 specifying the required compute resource and/or parameters (e.g., 0.5 GB cache deployment), the appropriate instructions to provide to the orchestrator 140 in order to deploy containers (e.g., service container 150A-B) that provision the requested compute resource.

Figure 2:
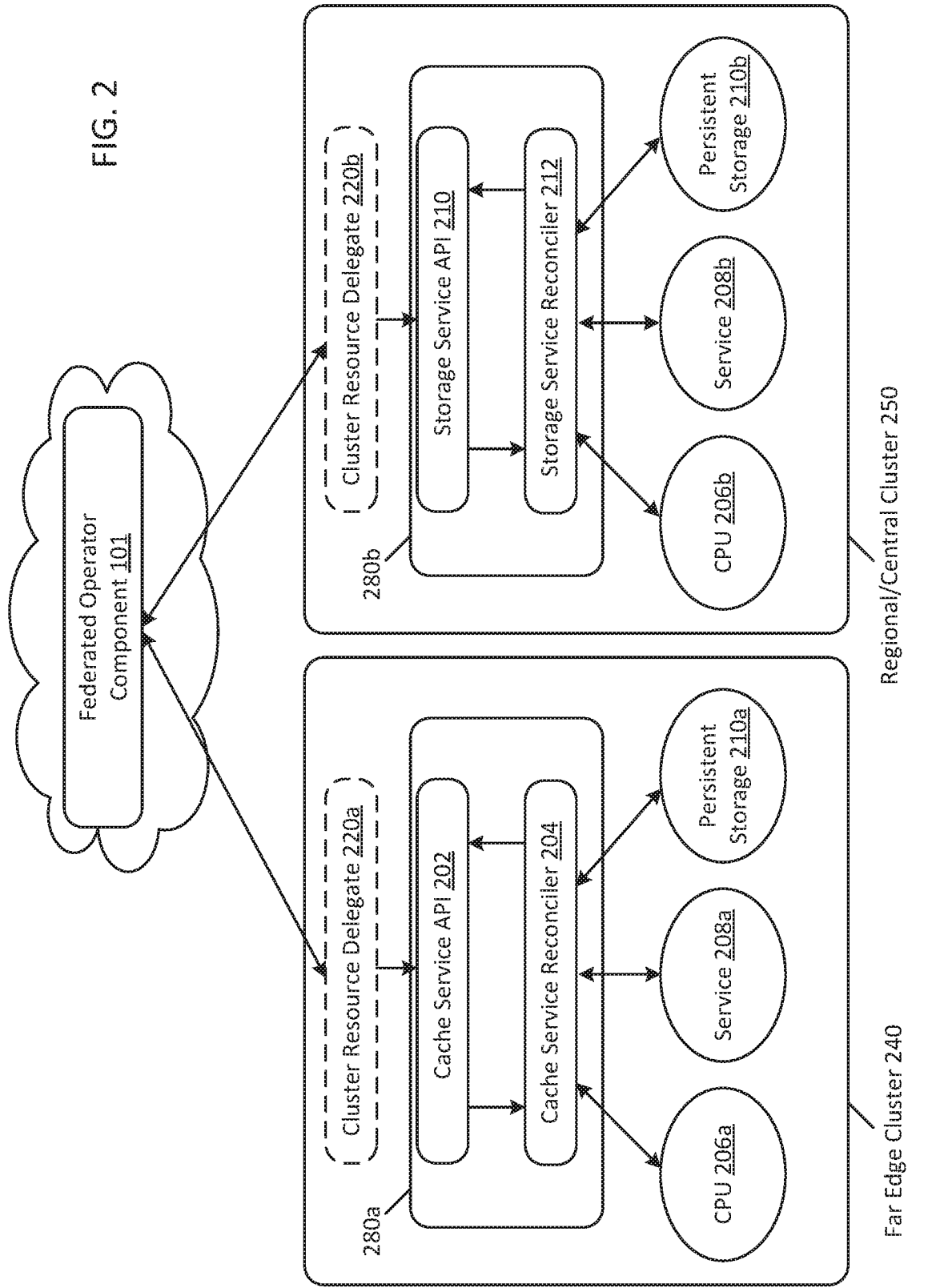
FIG. 2 is a block diagram illustrating communication between a federated operator component and different clusters in an edge computing network according to an example of the present disclosure.

FIG. 2 is a block diagram illustrating communication between a federated operator component and different clusters in an edge computing network according to an example of the present disclosure. In the example in FIG. 2, a federated operator component 101 deploys a compute service across different clusters disposed at different hierarchical levels. For example, federated operator component 101 may provision compute resources, such as CPU 206a (e.g., a compute resource), service 208a (e.g., a network service), and persistent storage 210a on far edge cluster 240. Similarly, federated operator component 101 may provision compute resources CPU 206b, service 208b, and/or persistent storage 210b on regional/central cluster 250. In various examples, the federated operator component 101 may deploy different compute resources of a compute service across different clusters.

In the example depicted in FIG. 2, federated operator component 101 may deploy a cache resource on far edge cluster 240 and a persistent storage resource to regional/central cluster 250. In some examples, the federated operator component 101 may send a request to provision the cache resource that may be interpretable by cache service API 202 of operator component 280a executing on far edge cluster 240. In various examples, this may include generating the request, by federated operator component 101, that is in a defined format for cache service API 202 of operator component 280a.

Similarly, federated operator component 101 may send a request to provision the persistent storage resource that may be interpretable by storage service API 210. In various examples, this may include generating the request, by federated operator component 101, that is in a defined format for storage service API 210 of operator component 280b. Operator components 280a and 280b may be from different vendors and accordingly may have different specifications for their external-facing APIs (e.g., cache service API 202 and storage service API 210). Accordingly, federated operator component 101 may generate specific instructions that are interpretable by the operator-specific APIs (e.g., cache service API 202 and storage service API 210).

In another example, instead of generating vendor-specific instructions for each operator component API, federated operator component 101 may instead deploy a cluster resource delegate for each cluster. For example, federated operator component 101 may deploy cluster resource delegate 220a for far edge cluster 240 and cluster resource delegate 220b for regional/central cluster 250. In various examples, the cluster resource delegates 220a-220b may receive instructions from federated operator component 101 (e.g., instructions to deploy compute resources, re-balance compute resources, upgrade instructions, etc.) that are in a common format. However, each of the cluster resource delegates 220a-220b may be configured to modify the instructions to a form suitable for input into the API of the particular operator component. Accordingly, cluster resource delegate 220a may receive instructions to deploy a specified amount of cache on far edge cluster 240. Cluster resource delegate 220a may modify the instructions to generate modified instructions that are in a form suitable for input into cache service API 202. Similarly, cluster resource delegate 220b may receive instructions to deploy a specified amount of persistent storage on regional/central cluster 250. Cluster resource delegate 220b may modify the instructions to generated modified instructions that are in a form suitable for input to storage service API 210. Accordingly, cluster resource delegates 220a-220b may be software configured to translate instructions received from the federated operator component 101 into operator-specific instructions (e.g., instructions suitable for input into APIs of the operator component on which the cluster resource delegate is executing).

In the example of FIG. 2, federated operator component 101 may deploy a compute service (e.g., a content delivery service) comprising an amount of cache and an amount of persistent storage. Federated operator component 101 may send a request to deploy the requested amount of cache to either cluster resource delegate 220a or directly to cache service API 202 (depending on the implementation). Similarly, federated operator component 101 may send a request to deploy the requested amount of persistent storage to either cluster resource delegate 220b or directly to storage service API 210 (depending on the implementation). Cache service API 202 may pass data representing the request for the cache to cache service reconciler 204. The cache service reconciler 204 may communicate with a master node of far edge cluster 240 to provision the requested first amount of cache among one or more containers launched by one or more nodes of the far edge cluster 240. Similarly, the storage service API 210 may pass data representing the request for the persistent storage-to-storage service reconciler 212. The storage service reconciler 212 may communicate with a master node of regional/central cluster 250 to provision the requested amount of persistent storage (e.g., persistent storage 210b) among one or more containers launched by one or more nodes of the regional/central cluster 250. In various examples, it may be advantageous to provision cache in clusters closer to the far edge and persistent storage at more centralized locations (e.g., for latency and/or data security).

As described in further detail below, federated operator component 101 may generate security certificates (and/or other access credentials) and may have the security certificates signed by a certificate authority. The signed security certificates may be provisioned on each cluster (e.g., on far edge cluster 240 and regional/central cluster 250) to enable communication between the clusters and/or between the various components of the compute service that are distributed across different clusters. For example, a signed security certificate may be used as an access credential to permit the cache service deployed on far edge cluster 240 to communicate with the persistent storage service (e.g., persistent storage 210b) deployed on regional/central cluster 250. In various examples, the signed security certificate may be used to encrypt/decrypt data sent between the far edge cluster 240 and the regional/central cluster 250.

In some further examples, the federated operator component 101 may generate a connectivity map that defines a mesh network to enable communication between the various compute services deployed across different clusters. For example, the federated operator component 101 may maintain a routing table that translates between virtual and physical addresses of the cache service deployed on far edge cluster 240 and the persistent storage service deployed on regional/central cluster 250. Since both the cache service and the persistent storage service may be part of the same compute service (e.g., a content delivery network) the federated operator component 101 may maintain and update routing tables to ensure reliable communication between different compute resources deployed across different clusters. Additionally, the connectivity map generated by the federated operator component 101 may enable access control, circuit breaking, quality of service, etc. The federated operator component 101 may automatically generate the service mesh (e.g., the connectivity map) when a compute service (e.g., a CDN) is provisioned. Additionally, the federated operator component 101 may maintain session affinity and routing table updates when individual compute resources/services on clusters are altered, re-balanced, and/or transitioned from one node or cluster to another.

In some further examples, federated operator component 101 may maintain SLAs related to compute resources/services deployed across different clusters. For example, when the federated operator component 101 provisions a CDN service on multi-tenant clusters in an edge computing network, the federated operator component 101 may maintain a specified cache capacity and/or storage capacity according to an SLA of the CDN. For instance, the federated operator component 101 may initially provision 1 GB of cache on far edge cluster A (not shown in FIG. 2) and 1 GB of cache on far edge cluster B (not shown in FIG. 2). During CDN service, far edge cluster A may be overloaded and may only be able to provide 0.5 GB cache. Accordingly, the federated operator component 101 may re-balance the cache service for the CDN by requesting that an additional 0.5 GB of cache be provisioned on far edge cluster B. In addition, the routing tables for the relevant cache may be updated by the federated operator component 101.

In various other examples, federated operator component 101 may scale compute resources (up and down) across different hierarchical levels of different clusters according to SLAs of the compute service (e.g., a CDN). For example, when federated operator component 101 provides CDN service on an edge computing network (e.g., on multi-tier and/or multi-tenant clusters), the federated operator component 101 may maintain SLAs by adjusting the compute resource parameters until the SLAs are met. For example, a CDN deployed by federated operator component 101 may deploy 2 GB of cache with 1 GB provisioned by far edge cluster A and 1 GB provisioned by far edge cluster B, and 10 GB storage provisioned by regional edge cluster C. Additionally, the CDN may have an SLA specifying a 90% hit ratio on the caches. During production, the effective hit ratio may fall below 90%. In response, the federated operator component 101 may request additional cache from far edge A and/or far edge B until the hit ratio specified by the SLA is met. Conversely, when the effective hit ratio is above the SLA, resources may be released from far edge cluster A and/or far edge cluster B until the 90% hit ratio is met.

In some further examples, federated operator component 101 may provide upgrade/maintenance policies across multiple clusters across different hierarchical levels of edge computing network clusters. For example, an administrator may create a CDN upgrade strategy that triggers cache services on far edge clusters A and B to reconfigure or upgrade only when the storage service (e.g., persistent storage 210b) is successfully upgraded and/or reconfigured to ensure service availability during maintenance. Upgrade sequences may be specified using an upgrade strategy deployed by federated operator component 101.

In some further examples, federated operator component 101 may provision a global level domain name system (DNS) resolution and service/resource discovery for a particular compute service deployed across multiple edge clusters (e.g., far edge cluster 240 and/or regional/central cluster 250, among other possible clusters). In various examples, the DNS information may be included in the "status" field of an API object/declaration.

Figure 3:
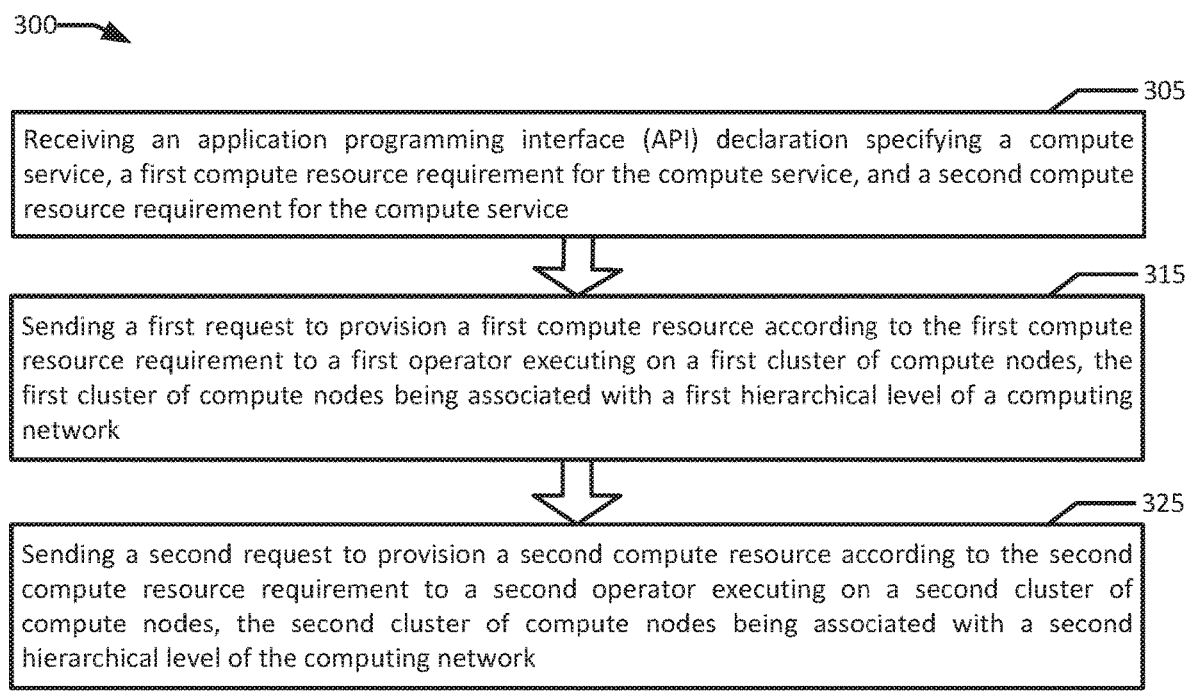
FIG. 3 is flowchart illustrating an example process for deploying a compute service among different clusters of compute nodes according to an example of the present disclosure.

FIG. 3 illustrates a flowchart illustrating an example process 300 for deploying a compute service among different clusters of compute nodes according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving an API declaration, where the API declaration specifies a compute service, a first compute resource requirement for the compute service, and a second compute resource requirement for the compute service (block 305). For example, the compute service may be a content delivery network, retail as a service, etc. The first compute resource requirement for the compute service may be, for example, a specified amount of cache for the CDN. The second compute resource requirement for the compute service may be, for example, a specified amount of persistent storage for the CDN. In an example, the API declaration may be received by federated operator component 101 through an external-facing API (e.g., an API accessible by an administrator and/or developer that may be used to deploy an inter-cluster compute service, as described herein).

In an example, the process 300 may include sending a first request to provision a first compute resource according to the first resource requirement to a first operator executing on a first cluster of compute nodes, and the first cluster of compute nodes may be associated with a first hierarchical level of a computing network (block 315). For example, federated operator component 101 may send a request to provision a first compute resource that satisfies the first resource requirement to operator component 280a executing on far edge cluster 240 (FIG. 2). In some examples, the first cluster may be associated with a far edge cluster of compute nodes, an aggregated edge cluster (e.g., a higher hierarchical level relative to a far edge cluster), a regional cluster (e.g., if the far edge cluster is a set of compute nodes with physical components in Orlando, Fla., the regional cluster may be a set of compute nodes for the South East region of the US), a centralized cluster (e.g., a cluster of compute nodes that communicates with and manages a set of regional clusters), etc. In the example, the request of block 315 may be a request to provision a cache resource, a storage resource, and/or some other resource used by the compute service.

In an example, the process 300 may include sending a second request to provision a second compute resource according to the second resource requirement to a second operator executing on a second cluster of compute nodes, and the second cluster of compute nodes may be associated with a second hierarchical level of a computing network (block 325). For example, federated operator component 101 may send a request to provision a second compute resource that satisfies the second resource requirement to operator component 280b executing on regional/central cluster 250 (FIG. 2). Additionally, in some examples, if the first cluster is associated with a far edge cluster of compute nodes, the second cluster may be associated with an aggregated edge cluster, a regional edge cluster, and/or a centralized edge cluster.

Example pseudocode of an API declaration received by a federated operator component that may, in turn, be used to programmatically generate requests to provision a first compute service (e.g., a CDN) among different clusters is depicted below. The API declaration includes a cache service requirement with a hit ratio SLA of 90%, where the cache is distributed between two edge clusters. The API declaration also includes a storage capacity requirement of 10Gi to be provisioned by a regional cluster (e.g., a cluster that is at a higher hierarchical level in the edge computing network relative to the two clusters on which the cache resources are deployed).

```
apiVersion: federated-operator.io/v1
kind: CDN
metadata:
    name: example.com
    Namespace: my-space
```

-continued

```
spec:
    caches:
        capacity: 2Gi
        hitRatioSLA: 90%
        locations:
            - name: edge-A
              clusterId: 001
            - name: edge-B
              clusterId: 002
    storage:
        capacity: 10Gi
        locations:
            - name: regional-C
              clusterId: 003
```

Figure 4:
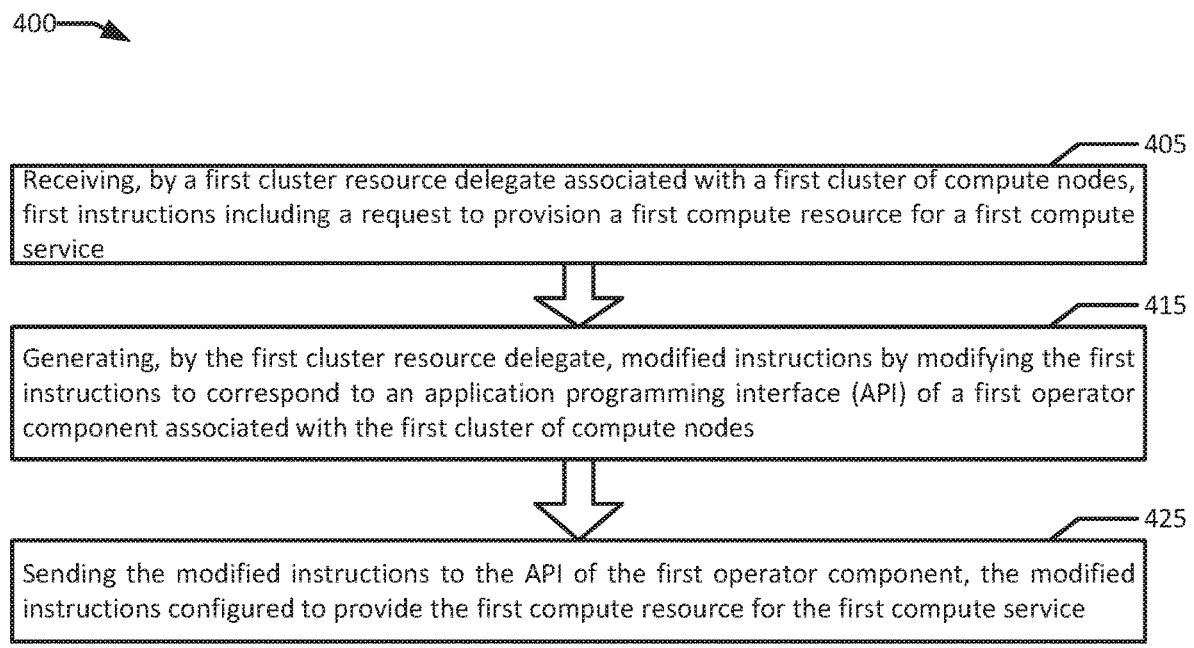
FIG. 4 is flowchart illustrating an example provisioning of a compute resource by a cluster resource delegate according to an example of the present disclosure.

FIG. 4 is flowchart illustrating an example process 400 for provisioning of a compute resource by a cluster resource delegate according to an example of the present disclosure. Although the example process 400 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 400 includes receiving, by a first cluster resource delegate associated with a first cluster of compute nodes, first instructions including a request to provision a first compute resource for a first compute service (block 405). In various examples, a first cluster resource delegate (e.g., cluster resource delegate 220a) may be executing on a first cluster of compute nodes (e.g., far edge cluster 240). The first cluster resource delegate may receive instructions from a federated operator component (e.g., from federated operator component 101). The first instructions may include a request to provision a first compute resource for a first compute service. For example, the first instructions may be a request to provision a specified amount of cache for a CDN on the first cluster.

The example process 400 may include generating, by the first cluster resource delegate, modified instructions by modifying the first instructions to correspond to an API of a first operator component associated with the first cluster of compute nodes (block 415). For example, the instructions received by the cluster resource delegate 220a may be general instructions generated by federated operator component 101. The cluster resource delegate 220a may parse the instructions and generate modified instructions that are in a format specific to the particular operator component (e.g., operator component 280a) executing on the particular cluster (e.g., far edge cluster 240).

The example process 400 may include sending the modified instructions to the API of the first operator component, where the modified instructions are configured to provide the first compute resource for the first compute service (block 425). For example, after generating the operator-specific modified instructions, the cluster resource delegate (e.g. cluster resource delegate 220a) may send the modified instructions to the operator component (e.g., operator component 280a). In some further examples, the operator component 280a may generate the request for the particular compute resource and may send the request to a reconciler (e.g., cache service reconciler 204). The cache service reconciler, in turn, may communicate with the master node of the orchestration framework executing on the cluster (e.g., far edge cluster 240) to determine on which nodes of the cluster to deploy the compute resource. In at least some examples, the master node may launch the containers (and/or other trusted execution environments) for the specified compute resource.

Figure 5A:
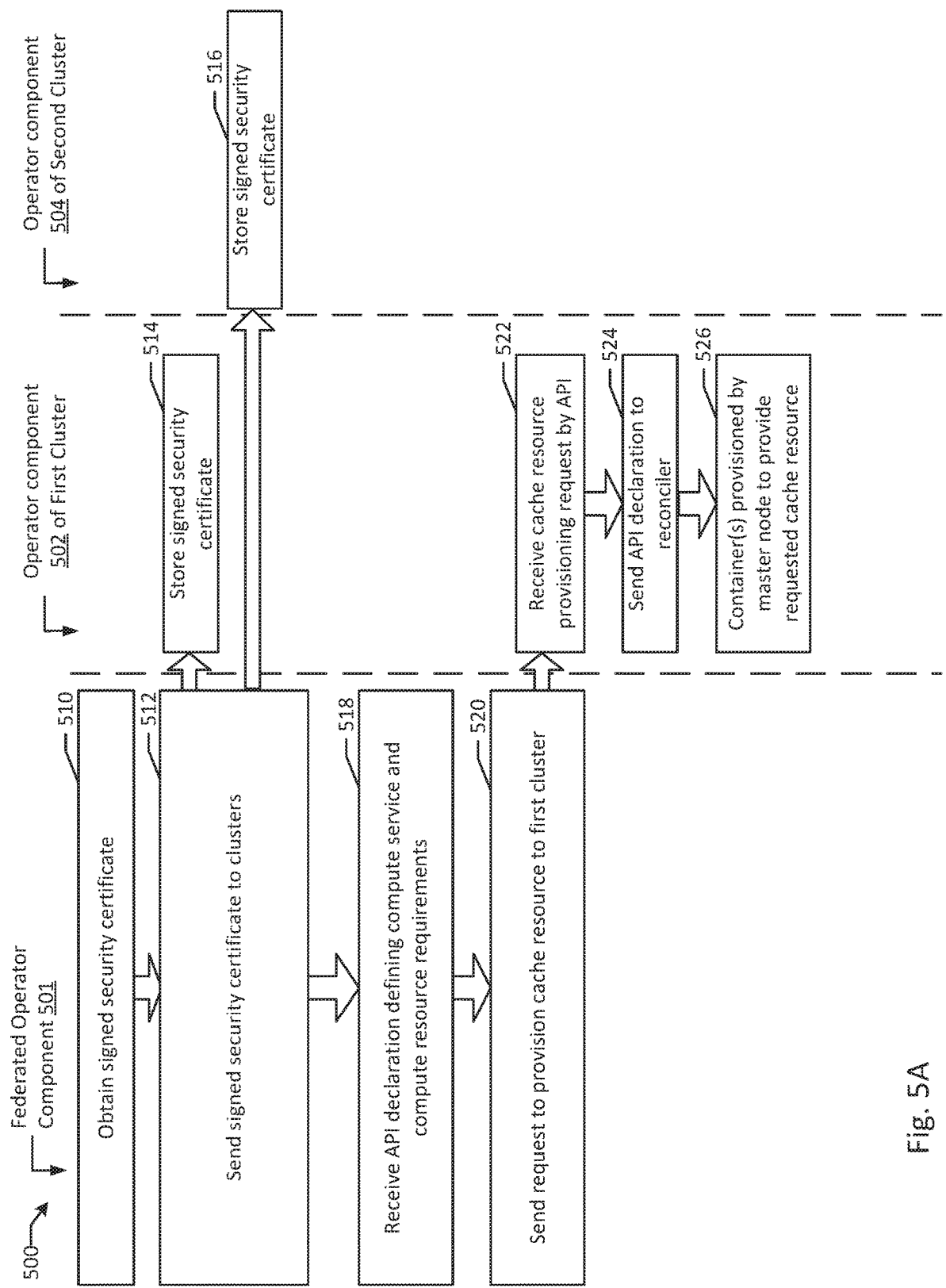
FIGS. 5A and 5B illustrate a flow diagram of an example of provisioning of different compute resources of a compute service across different compute clusters according to various aspects of the present disclosure.
Figure 5B:
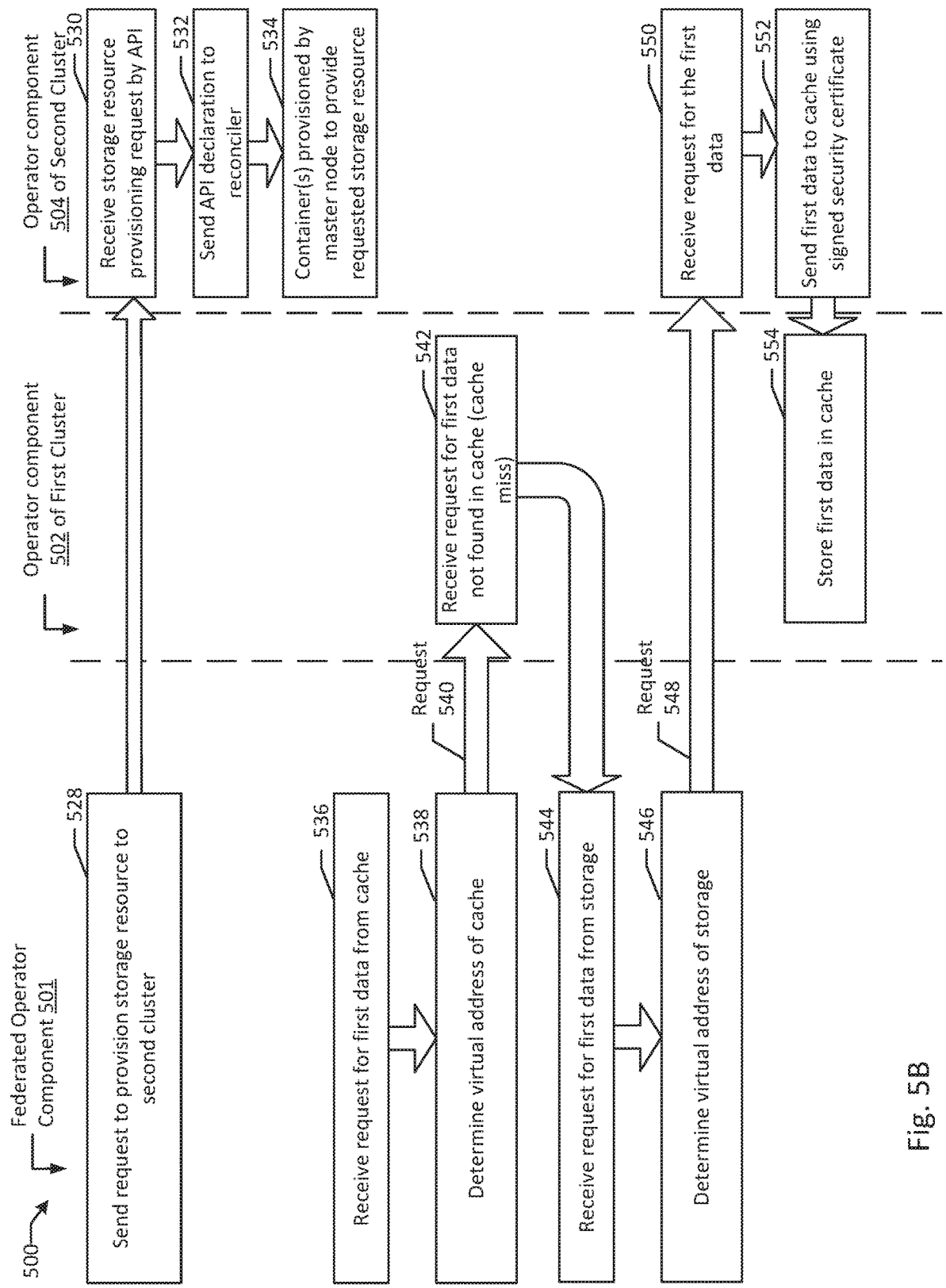

FIGS. 5A and 5B illustrate a flow diagram 500 of an example of provisioning of different compute resources of a compute service across different compute clusters according to various aspects of the present disclosure. Although the examples below are described with reference to the flow diagram illustrated in FIGS. 5A and 5B, it will be appreciated that many other methods of performing the acts associated with FIGS. 5A and 5B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, federated operator component 501 coordinates the provisioning of a cache resource on a first cluster (e.g., a cluster on which operator component 502 is executing) and the provisioning of a storage resource on a second cluster (e.g., a cluster on which operator component 504 is executing).

In various examples, prior to sending requests to different clusters for the provisioning of different compute resources used by a compute service (e.g., a CDN), federated operator component may generate security credentials to enable cross-cluster communication and/or encryption/decryption of data sent between clusters. Accordingly, federated operator component 501 may generate security certificate data that may be sent to the different clusters on which various compute resources of a distributed compute service are provisioned. In the example depicted in FIG. 5A, federated operator component 501 may generate a security certificate and may send the security certificate to a trusted certificate authority to be signed. Accordingly, federated operator component 501 may obtain a signed security certificate (block 510). Federated operator component 501 may send the signed security certificate to the different clusters that are to be used to provision various compute resources of a compute service that is to be deployed by federated operator component.

In the example depicted in FIG. 5A, federated operator component 501 may send the signed security certificate to operator component 502 of a first cluster and operator component 504 of a second cluster (bock 512). The operator component 502 of the first cluster may store the signed security certificate (block 514). For example, the operator component 502 may store the signed security certificate in a keystore associated with the first cluster. Similarly, the operator component 504 of the second cluster may store the signed security certificate (block 516). For example, the operator component 504 may store the signed security certificate in a keystore associated with the second cluster. In various examples, the signed security certificate may enable secure communication (e.g., may include access credentials) that allow communication between compute resources provisioned by operator component 502 of the first cluster and compute resources provisioned by operator component 504 of the second cluster. In various examples, the signed security certificate may be sent in conjunction with encryption keys that may be used to encrypt and/or decrypt data sent between the resources provisioned by each cluster. Accordingly, the signed security certificate (and/or other access credentials) may enable secure, trusted communication between compute resources of the same service even when the compute resources are executing on different clusters of an edge-based computing network.

Federated operator component 501 may receive an API declaration defining a compute service and one or more compute resource requirements (block 518). For example, the API declaration may specify a type of compute service (such as a CDN) and may specify SLAs, compute resource requirements (e.g., storage, cache), and/or other parameters of the compute service. In the example depicted in FIGS. 5A and 5B, the compute resource requirements may include a cache requirement and a storage requirement.

Federated operator component 501 may send a request to provision a cache resource to a first cluster (block 520). In the example, operator component 502 of the first cluster may receive the cache resource provisioning request at an API of the operator component 502 (block 522). In various examples, although not depicted in FIGS. 5A and 5B, the federated operator component 501 may instead send the cache resource provisioning request to a cluster resource delegate (not shown) executing on the operator component 502 of the first cluster. The cluster resource delegate may modify the request to generate modified instructions interpretable by the API of the operator component 502. Operator component 502 may send the API declaration that includes the specification of the cache resource requirements to a reconciler of the operator component 502 (block 524). The reconciler may communicate with a master node of the first cluster to provision one or more containers (or other trusted execution environments) on nodes of the first cluster to provide the requested cache resource (block 526).

As illustrated in FIG. 5B, the federated operator component 501 may send a request to provision a storage resource to operator component 504 of the second cluster (block 528). In various examples, the second cluster may be at a different hierarchical level of an edge-based computing network relative to the first cluster. For example, it may be advantageous to provision persistent storage at a higher hierarchical level (e.g., a more general level) so that data of the cross-cluster compute service is still accessible in the event that communication is interrupted with one or more far edge clusters provisioning cache resources. The operator component 504 of the second cluster may receive the storage resource provisioning request at an API of the operator component 504 (block 530). In various examples, although not depicted in FIGS. 5A and 5B, the federated operator component 501 may instead send the cache resource provisioning request to a cluster resource delegate (not shown) executing on the operator component 504 of the second cluster. The cluster resource delegate may modify the request to generate modified instructions interpretable by the API of the operator component 504.

Operator component 504 may send the API declaration that includes the specification of the cache resource requirements to a reconciler of the operator component 504 (block 532). The reconciler may communicate with a master node of the second cluster to provision one or more containers (or other trusted execution environments) on nodes (sometimes referred to as hosts) of the second cluster to provide the requested storage resource (block 534).

Later, during operation of the compute service (e.g., the CDN), the federated operator component 501 may receive a request for first data from the cache (block 536). In various examples, the request for first data may be received from a consumer of the data. The federated operator component 501 may consult a connectivity map that maps virtual addresses of provisioned compute resources to the corresponding physical addresses. Federated operator component 501 may determine a virtual address of the cache (block 538). Federated operator component may send request 540 to retrieve the first data from the cache to operator component 502 of the first cluster. Operator component 502 and/or the cache service provisioned on the first cluster may receive the request for the first data and may determine that the first data is not stored in the provisioned cache (block 542). In other words, a cache miss may occur. The cache service and/or the operator component 502 may relay the cache miss to the federated operator component 501. The federated operator component 501 may, in turn, relay the cache miss to the device requesting the first data (e.g., the consumer device using the compute service). Thereafter, after determining a cache miss, the federated operator component 501 may receive a request to retrieve the first data from persistent storage (block 544) (e.g., the persistent storage provisioned for the compute service in blocks 530, 532, and 534). Accordingly, the federated operator component 546 may determine the virtual address of the storage from a connectivity map maintained for the compute service. Thereafter, federated operator component 501 may send request 548 for the first data to operator component 504 (and/or directly to the storage service previously provisioned on the second cluster). Operator component 504 (and/or the storage service) may receive request 548 for the first data (block 550). The operator component 504 and/or the storage service may retrieve the first data from the persistent storage provisioned for the compute service (e.g., the CDN) and may return the first data to the requesting device (e.g., via federated operator component 501 and/or via some other gateway). In addition, operator component 504 may send the first data to the cache service provisioned on the first cluster using the signed security certificate (block 552) and the operator component 502 may store the first data in the cache (block 554). In various examples, in order for the storage service provisioned on the second cluster to communicate with the cache service provisioned on the first cluster, the two clusters may exchange access credentials (e.g., the signed security certificate provisioned by federated operator component at block 512 and stored by the respective clusters at blocks 514 and 516).

Figure 6A:
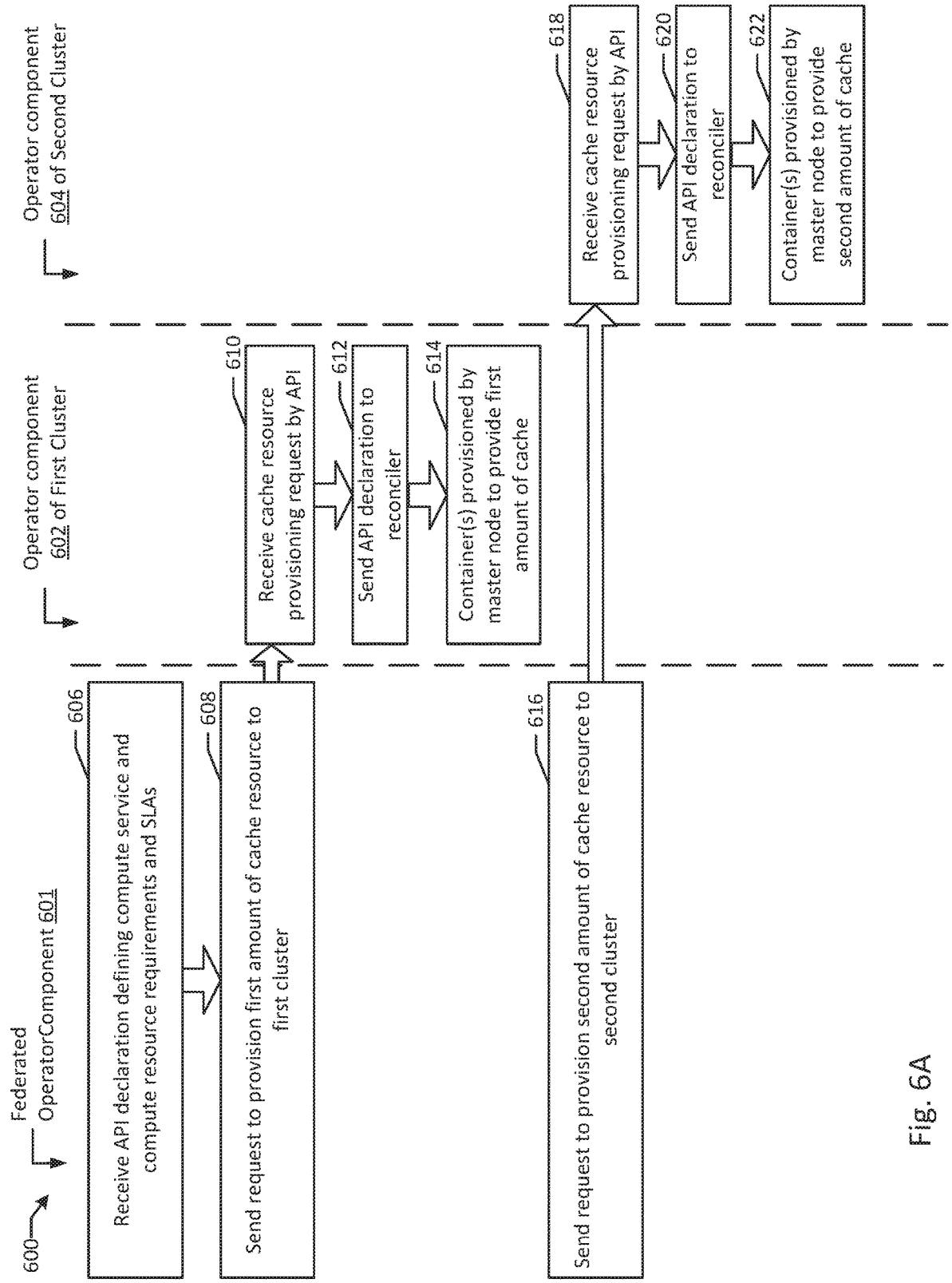
FIGS. 6A and 6B illustrate a flow diagram of an example of rebalancing of a compute resource by a federated operator component in accordance with various aspects of the present disclosure.
Figure 6B:
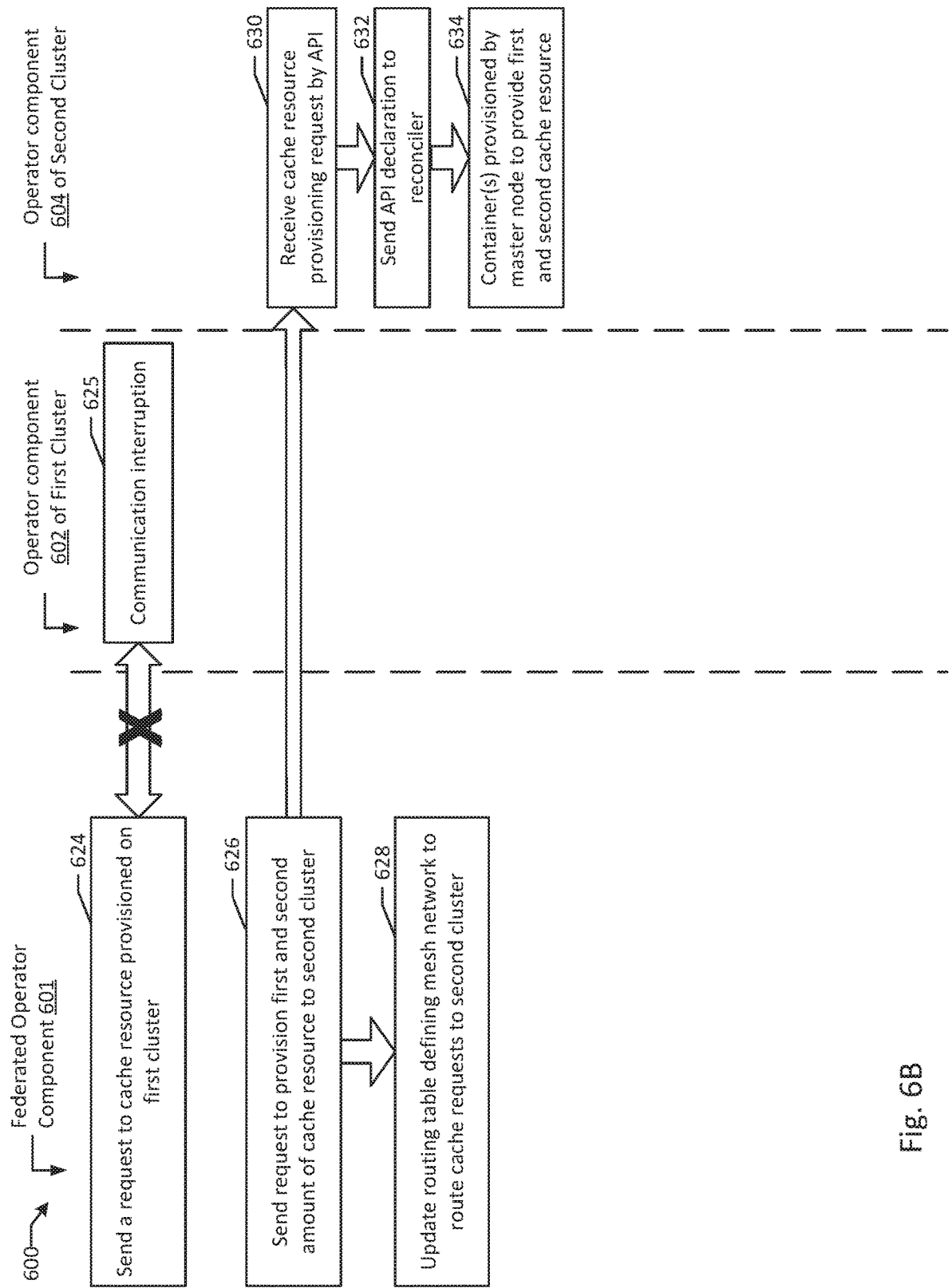

FIGS. 6A and 6B illustrate a flow diagram 600 of an example of rebalancing of a compute resource by a federated operator component in accordance with various aspects of the present disclosure. Although the examples below are described with reference to the flow diagram illustrated in FIGS. 6A and 6B, it will be appreciated that many other methods of performing the acts associated with FIGS. 6A and 6B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, federated operator component 601 coordinates the provisioning of a cache resource on a first cluster (e.g., a cluster on which operator component 602 is executing) and the provisioning of another cache resource on a second cluster (e.g., a cluster on which operator component 604 is executing). Additionally, federated operator component 601 rebalances the cache resources when communication with the first cluster is interrupted.

Federated operator component 601 may receive an API declaration defining a compute service, one or more compute resource requirements, and SLAs (block 606). For example, the API declaration may specify a type of compute service (such as a CDN) and may specify SLAs, compute resource requirements (e.g., cache), and/or other parameters of the compute service. In the example depicted in FIGS. 6A and 6B, the compute resource requirements may include a distributed cache requirement between multiple clusters.

Federated operator component 601 may send a request to provision a first amount of cache resource to a first cluster (block 608). In the example, operator component 602 of the first cluster may receive the cache resource provisioning request at an API of the operator component 602 (block 610). In various examples, although not depicted in FIGS. 6A and 6B, the federated operator component 601 may instead send the cache resource provisioning request to a cluster resource delegate (not shown) executing on the operator component 602 of the first cluster. The cluster resource delegate may modify the request to generate modified instructions interpretable by the API of the operator component 602. Operator component 602 may send the API declaration that includes the specification of the cache resource requirements to a reconciler of the operator component 602 (block 612). The reconciler may communicate with a master node of the first cluster to provision one or more containers (or other trusted execution environments) on nodes of the first cluster to provide the requested first amount of cache resource (block 614).

Federated operator component 601 may send a request to provision a second amount of cache resource to a second cluster (block 616) according to the API declaration received at block 606. In the example, operator component 604 of the second cluster may receive the cache resource provisioning request at an API of the operator component 604 (block 618). In various examples, although not depicted in FIGS. 6A and 6B, the federated operator component 601 may instead send the cache resource provisioning request to a cluster resource delegate (not shown) executing on the operator component 604 of the second cluster. The cluster resource delegate may modify the request to generate modified instructions interpretable by the API of the operator component 604. Operator component 604 may send the API declaration that includes the specification of the cache resource requirements to a reconciler of the operator component 604 (block 620). The reconciler may communicate with a master node of the second cluster to provision one or more containers (or other trusted execution environments) on nodes of the second cluster to provide the requested second amount of cache resource (block 622).

As illustrated in FIG. 6B, federated operator component 601 may send a request to the cache resource provisioned on the first cluster (block 624). Upon receiving a timeout and/or other data indicating that communication with the cache resource and/or the first cluster has been interrupted (block 625), federated operator component 601 may send a request to provision both the first and the second amount of cache specified by the API declaration received at block 606 to the second cluster (block 626). Although in the example depicted in FIG. 6B the request sent at block 626 is sent to the second cluster, in various other examples, the request to provision the first amount of cache may be sent to some other cluster (not shown) while the second cluster may continue to provision the second amount of cache provisioned at block 622.

Operator component 604 of the second cluster may receive the request at an API of the operator component 604 (block 630). In various other examples and as discussed previously, the federated operator component 601 may instead send the request to a cluster resource delegate executing on operator component 604 which may in turn generate modified instructions interpretable by the API of the operator component 604. Operator component 604 may send the API declaration that includes the specification of the cache resource requirements to a reconciler of the operator component 604 (block 632). The reconciler may communicate with a master node of the second cluster to provision one or more containers (or other trusted execution environments) on nodes of the second cluster to provide the requested first amount of cache resource in addition to the previously-provisioned second amount of cache resource (block 634). Additionally, federated operator component 601 may update a routing table and/or other connectivity map to associate a virtual address of the newly-provisioned first amount of cache on the second cluster to a corresponding physical address (block 628). Accordingly, the federated operator component 601 may dynamically re-balance the compute resources of a cross-cluster, distributed compute service, as needed. In various other examples, instead of communication interruption, one cluster and/or compute resource may become overburdened and/or unable to meet a particular SLA of a compute service. In response, the federated operator component 601 may re-balance the compute resource by off-loading all or a portion of the compute resource to another cluster or to another node within the same cluster.

Figure 7:
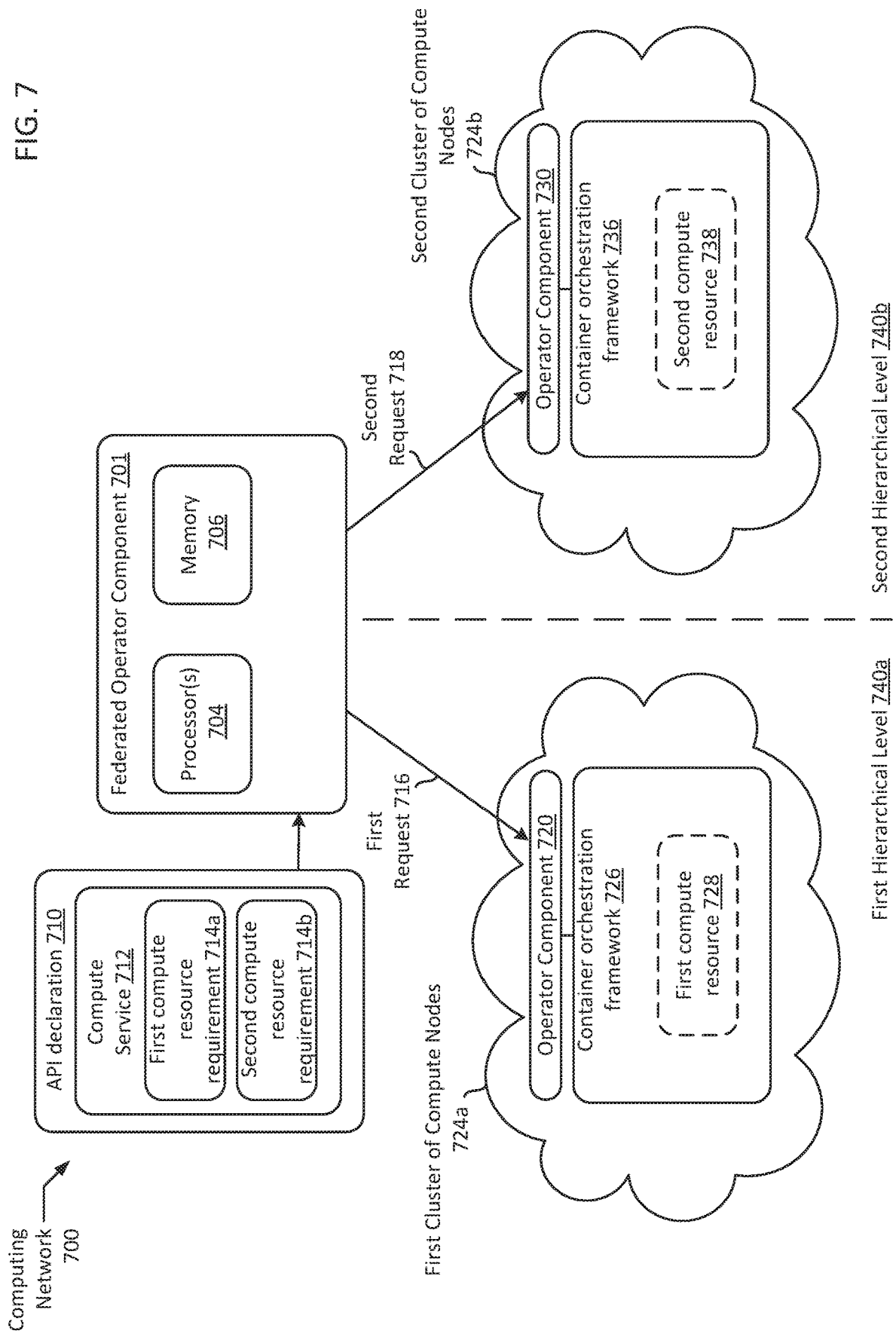
FIG. 7 is block diagram of a federated operator component in an edge computing network according to an example of the present disclosure.

FIG. 7 is block diagram of a federated operator component 701 in an edge-computing network 700 according to an example of the present disclosure. The computing network 700 may include a federated operator component 701 configured in communication with a first cluster of compute nodes 724a and a second cluster of compute nodes 724b. In various examples, the federated operator component 701 may comprise at least one processor 704 and a memory 706 (e.g., a non-transitory computer-readable memory) in communication with the at least one processor 704. The first cluster of compute nodes 724a may include an operator component 720 executing on a container orchestration framework 726. Similarly, the second cluster of compute nodes 724b may include an operator component 730 executing on a container orchestration framework 736.

The first cluster of compute nodes 724a may be disposed at a first hierarchical level 740a. For example, the first cluster of compute nodes 724a may be arranged geographically proximate to a consumer of resources provisioned by the first cluster of compute nodes 724a (e.g., a far edge cluster). Similarly, the second cluster of compute nodes 724b may be disposed at a second hierarchical level 740b. For example, the second cluster of compute nodes 724b may be centralized with respect to one or more far edge and/or regional clusters of compute nodes.

In the example system depicted in FIG. 7, federated operator component 701 may receive an API declaration 710 that comprises an identification of a compute service 712, a first compute resource requirement 714a, and a second compute resource requirement 714b. The compute service may be any type of compute service that is to be deployed across multiple clusters (e.g., across first cluster of compute nodes 724a and second cluster of compute nodes 724b). The first compute resource requirement 714a and the second compute resource requirement 714b may be specified provisioning requirements of the compute service 712. In the example where compute service 712 is a CDN, first compute resource requirement 714a may be a specified amount of cache for the compute service 712. Additionally, the first compute resource requirement 714a may be an SLA specifying a hit ratio and/or a latency requirement for the compute service 712. In an example, the second compute resource requirement 714b may specify a required amount of persistent storage and/or any other compute resource requirement for the compute service 712.

Upon receipt of the API declaration 710, federated operator component 701 may send a first request 716 to first cluster of compute nodes 724a. In an example, the first request 716 may be a request to provision the first compute resource 728 associated with first compute resource requirement 714a on the first cluster of compute nodes 724a. Operator component 720 may receive the first request 716 and may provision the first compute resource 728 on one or more nodes of the first cluster of compute nodes 724a. For example, a reconciler of operator component 720 may communicate with a master node of the container orchestration framework 726 to launch one or more containers that may provision the first compute resource 728.

Similarly, federated operator component 701 may send a second request 718 to second cluster of compute nodes 724b. In an example, the second request 718 may be a request to provision the second compute resource 738 associated with second compute resource requirement 714b on the second cluster of compute nodes 724b. Operator component 730 may receive the second request 718 and may provision the first compute resource 738 on one or more nodes of the second cluster of compute nodes 724b. For example, a reconciler of operator component 730 may communicate with a master node of the container orchestration framework 736 to launch one or more containers that may provision the second compute resource 738.

Figure 8:
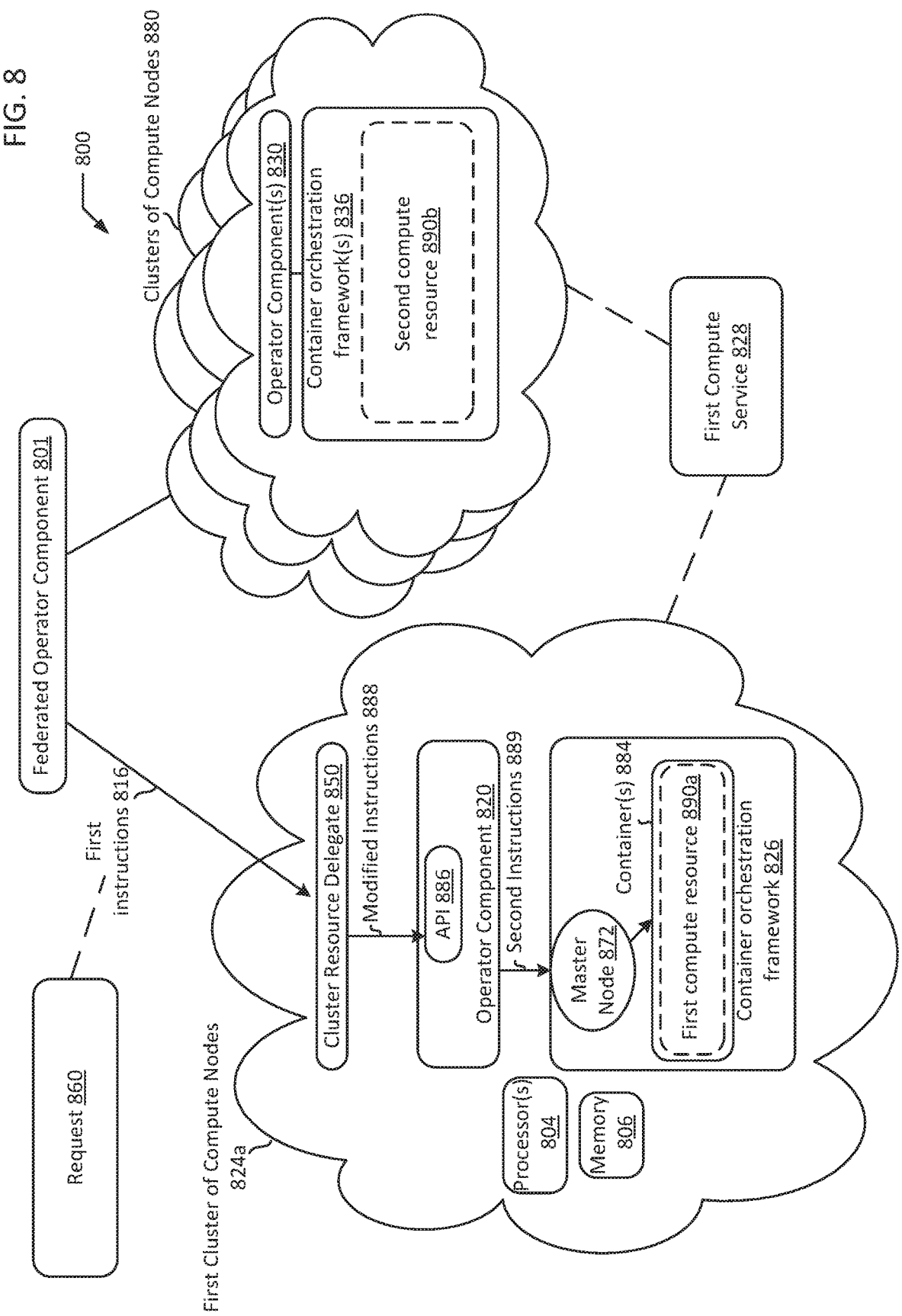
FIG. 8 is block diagram of a system for deploying a compute service via a federated operator component according to an example of the present disclosure.

FIG. 8 is block diagram of a system 800 for deploying a compute service via a federated operator component 801 according to an example of the present disclosure. A federated operator component 801 may be configured in communication with a plurality of clusters of compute nodes. For example, federated operator component 801 may be configured in communication with a first cluster of compute nodes 824a and with clusters of compute nodes 880 (e.g., a plurality of clusters). Each cluster of the plurality of clusters of compute nodes 880 may comprise a respective operator component 830 that may execute on top of a respective container orchestration framework 836. In various examples, the federated operator component 801 may deploy compute resources pertaining to one or more cross-cluster distributed compute services on various clusters among the clusters of compute nodes 880. As depicted in FIG. 8, a second compute resource 890b for a first compute service 828 is provisioned on at least one of the clusters of compute nodes 880.

Federated operator component 801 may send first instructions 816 to a cluster resource delegate 850 executing on operator component 820 of the first cluster of compute nodes 824a. The first instructions 816 may represent a request 860 specifying a first compute resource 890a for a first compute service 828. The cluster resource delegate 850 may be configured to modify the first instructions 816 to generate modified instructions 888 that are interpretable by API 886 of operator component 820. Accordingly, use of a cluster resource delegate 850 on each cluster (e.g., among clusters of compute nodes 880) avoids the need for federated operator component 801 to generate instructions that are tailored to different operator components (potentially from different vendors).

Operator component 820 may receive the modified instructions 888 at API 886 and may send second instructions 889 (e.g., via a reconciler, not shown in FIG. 8) to a master node 872 of a container orchestration framework 826 deployed on the first cluster of compute nodes 824a. The master node 872 may provision container(s) 884 that may deploy the requested first compute resource 890a for the first compute service 828. The first cluster of compute nodes 824a may comprise at least one processor 804 and at least one memory 806 that may be used to perform various operations described herein pertaining to the first cluster of compute nodes 824a.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a system comprises a memory and at least one processor in communication with the memory. In an example, the at least one processor is configured to execute a federated operator component. The federated operator component is configured to receive an application programming interface (API) declaration specifying a compute service, a first compute resource requirement for the compute service, and a second compute resource requirement for the compute service. The federated operator component is further configured to send a first request to provision a first compute resource according to the first compute resource requirement to a first operator component executing on a first container orchestration framework of a first cluster of compute nodes. The first cluster of compute nodes is associated with a first hierarchical level of a computing network. The federated operator component is also configured to send a second request to provision a second compute resource according to the second compute resource requirement to a second operator component executing on a second container orchestration framework of a second cluster of compute nodes, wherein the second cluster of compute nodes is associated with a second hierarchical level of the computing network that is different from the first hierarchical level.

In accordance with a 2nd example aspect of the present disclosure, which may be used in combination with any one or more of other aspects described herein (e.g., the 1st aspect), wherein the federated operator sends a signed security certificate to the first cluster of compute nodes and to the second cluster of compute nodes, wherein the signed security certificate enables encrypted communication between the first cluster of compute nodes and the second cluster of compute nodes.

In accordance with a 3rd example aspect of the present disclosure, which may be used in combination with any one or more of other aspects described herein (e.g., the 1st aspect), wherein the compute service comprises a content delivery network, and the first request to provision the first compute resource comprises a cache specification for the content delivery network, and wherein the second request to provision the second compute resource comprises a storage specification for the content delivery network.

In accordance with a 4th example aspect of the present disclosure, which may be used in combination with any one or more of other aspects described herein (e.g., the 1st aspect), wherein the first compute resource comprises a cache resource, the first cluster of compute nodes comprise edge compute nodes, the second compute resource comprises a storage resource, and the second cluster of compute nodes comprise centralized or regional compute nodes.

In accordance with a 5th example aspect of the present disclosure, which may be used in combination with any one or more of other aspects described herein (e.g., the 1st aspect), wherein the first request to provision the first compute resource is sent to a first cluster resource delegate of the first operator component, wherein the first cluster resource delegate is configured to transform the first request into first instructions configured to cause the first container orchestration framework to provision the first compute resource on the first cluster of compute nodes.

In accordance with a 6th example aspect of the present disclosure, which may be used in combination with any one or more of other aspects described herein (e.g., the 1st aspect), wherein the federated operator component generates a connectivity map defining a mesh network comprising routing destinations for compute services provided by the first cluster of compute nodes and the second cluster of compute nodes.

In accordance with a 7th example aspect of the present disclosure, which may be used in combination with any one or more of other aspects described herein (e.g., the 1st aspect), determine that the first cluster of compute nodes is unable to provide the first compute resource; and send a third request to provision the first compute resource to the second operator component, wherein the third request is configured to cause the second operator component to provision the first compute resource on one or more compute nodes of the second cluster of compute nodes.

In accordance with an 8th example aspect of the present disclosure, which may be used in combination with any one or more of other aspects described herein (e.g., the 1st aspect), wherein the first request comprises a first service level requirement for provisioning the first compute resource for the compute service, and wherein a reconciler component associated with the first operator component is effective to provision the first compute resource on compute nodes of the first cluster of compute nodes that are able to satisfy the first service level requirement.

In accordance with a 9th example aspect of the present disclosure, which may be used in combination with any one or more of other aspects described herein (e.g., the 1st aspect), wherein the first request for the first compute resource comprises a request to provision a first amount of cache and the second request for the second compute resource comprises a request to provision a second amount of cache, the federated operator further configured to: determine that the first cluster of compute nodes is deficient in providing the first amount of cache by a first deficiency amount; and send a third request to provision the first deficiency amount to a third operator component executing on a third container orchestration framework of a third cluster of compute nodes.

In accordance with a 10th example aspect of the present disclosure, which may be used in combination with any one or more of other aspects described herein (e.g., the 1st aspect), wherein the federated operator is further configured to: determine that the first cluster of compute nodes is deficient in providing the first compute resource; send a third request to provision the first compute resource to a third operator component executing on a third container orchestration framework of a third cluster of compute nodes; and update a routing table to route requests for the third compute resource to the appropriate address of the third cluster of compute nodes.

In accordance with a 11th example aspect of the present disclosure, which may be used in combination with any one or more of other aspects described herein (e.g., the 1st aspect), wherein the federated operator sends the first request to a first cluster resource delegate, the first cluster resource delegate configured to transform the first request to a first series of executable instructions executable by the first operator component and effective to cause the first operator component to provision the first compute resource on the first cluster of compute nodes; and the federated operator sends the second request to a second cluster resource delegate, the second cluster resource delegate configured to transform the second request to a second series of executable instructions executable by the second operator component and effective to cause the second operator component to provision the second compute resource on the second cluster of compute nodes.

In accordance with a 12th example aspect of the present disclosure, which may be used in combination with any one or more of other aspects described herein (e.g., the 1st aspect), wherein the federated operator is further configured to: schedule a first system upgrade for the first cluster of compute nodes, wherein the first compute resource provided by the first cluster of compute nodes comprises a persistent storage resource; and schedule a second system upgrade for the second cluster of compute nodes, wherein the second compute resource provided by the second cluster of compute nodes comprises a cache resource, and wherein the second system upgrade is scheduled to begin following completion of the first system upgrade.

Aspects of the subject matter described herein may be useful alone or in combination with one or more other aspects described herein. In a 13th example aspect of the present disclosure, a system comprises a memory; at least one processor in communication with the memory; a first operator component associated with a first container orchestration framework of a first cluster of compute nodes; and a first cluster resource delegate associated with the first cluster of compute nodes. The first cluster resource delegate is configured to: receive first instructions from a federated operator component configured in communication with a plurality of operator components, the first instructions comprising a request to provision a first compute resource for a first compute service, wherein each operator component of the plurality of operator components is associated with a respective cluster of compute nodes, and wherein the first compute service uses a second compute resource provisioned by a second cluster of compute nodes; and generate modified instructions by modifying the first instructions to correspond to an application programming interface (API) specific to the first operator component. The first operator component is effective to: receive, at the API, the modified instructions; and send second instructions to a master node of the first container orchestration framework to instantiate one or more containers configured to provide the first compute resource for the first compute service based on the modified instructions.

In accordance with a 14th example aspect of the present disclosure, which may be used in combination with any one or more of other aspects described herein (e.g., the 13th aspect), wherein the first cluster resource delegate is further configured to send data to the federated operator component, the data indicating a network address and/or a network port associated with the first compute resource.

In a 15th example aspect of the present disclosure, which may be used in combination with any one or more of other aspects described herein (e.g., the 13th aspect), wherein a signed certificate is received by the first cluster resource delegate from the federated operator component, wherein the first cluster resource delegate is further configured to send the signed certificate to the first operator component for storage in a key store associated with the first cluster of compute nodes.

In a 16th example aspect of the present disclosure, which may be used in combination with any one or more of other aspects described herein (e.g., the 13th aspect), the system may further comprise a second operator component associated with a second container orchestration framework of a second cluster of compute nodes; and a second cluster resource delegate associated with the second cluster of compute nodes. The second cluster resource delegate is configured to receive second instructions from the federated operator component, the second instructions comprising a request to provision a second compute resource for the first compute service by the second cluster of compute nodes.

In a 17th example aspect of the present disclosure, which may be used in combination with any one or more of other aspects described herein (e.g., the 13th aspect), wherein the second cluster resource delegate is further configured to generate modified second instructions by modifying the second instructions to correspond to an application programming interface (API) specific to the second operator component.

In a 18th example aspect of the present disclosure, which may be used in combination with any one or more of other aspects described herein (e.g., the 13th aspect), wherein the second cluster resource delegate is further configured to: receive second instructions from the federated operator component, the second instructions comprising a request to modify the first compute resource provisioned by the first cluster of compute nodes for the first compute service, wherein the request to modify the first compute resource is generated by the federated operator component based at least in part on a rebalancing of the first compute service by the federated operator component; and generate second modified instructions by modifying the second instructions to correspond to the API specific to the first operator component.

In accordance with a 19th example aspect of the present disclosure, which may be used in combination with any one or more of other aspects described herein (e.g., the 18th aspect), wherein the first operator component is effective to: receive, at the API, the modified second instructions; and send instructions to the master node of the first container orchestration framework rebalance the one or more containers based on the modified instructions.

Aspects of the subject matter described herein may be useful alone or in combination with one or more other aspects described herein. In a 20th example aspect of the present disclosure, a method of providing a compute service comprises receiving, at a first application programming interface (API) of a federated operator component, a first request to deploy a compute service; sending, by a federated operator component to a first operator component associated with a first cluster of compute nodes, a second request to provision a first compute resource for the compute service among the first cluster of compute nodes, wherein the first cluster of compute nodes is associated with a first hierarchical level of a computing network; and sending, by the federated operator component to a second operator component associated with a second cluster of compute nodes, a third request to provision a second compute resource for the compute service among the second cluster of compute nodes, wherein the second cluster of compute nodes is associated with a second hierarchical level of the computing network that is different from the first hierarchical level.

In accordance with a 21st example aspect of the present disclosure, which may be used in combination with any one or more of other aspects described herein (e.g., the 20th aspect), further comprising: determining, by the federated operator component, that communication with the first cluster of compute nodes has been interrupted; and sending, by the federated operator component to a third operator component associated with a third cluster of compute nodes, the second request to provision the first compute resource for the compute service among the third cluster of compute nodes.

In accordance with a 22nd example aspect of the present disclosure, which may be used in combination with any one or more of other aspects described herein (e.g., the 20th aspect), further comprising generating a connectivity map defining a mesh network, wherein the mesh network comprises routing instructions to send data to compute resources of the compute services provisioned by different clusters of compute nodes.

In accordance with a 23rd example aspect of the present disclosure, which may be used in combination with any one or more of other aspects described herein (e.g., the 20th aspect), further comprising: generating, by the federated operator component, certificate data; sending, by the federated operator component, the certificate data to a certificate authority; receiving, from the certificate authority by the federated operator component, signed certificate data; and sending, by the federated operator component, the signed certificate data to the first cluster of compute nodes and to the second cluster of compute nodes to enable encrypted communication between the first cluster of compute nodes and the second cluster of compute nodes.

In accordance with a 24th example aspect of the present disclosure, which may be used in combination with any one or more of other aspects described herein (e.g., the 20th aspect), further comprising: receiving, at the API of the federated operator component, a specification of a cache capacity for the compute service; and sending requests to operator components associated with respective clusters of compute nodes to provision the cache capacity across a plurality of clusters of compute nodes.

In accordance with a 25th example aspect of the present disclosure, which may be used in combination with any one or more of other aspects described herein (e.g., the 20th aspect), wherein the first compute resource is a storage resource for the compute service and the second compute resource is a cache resource. The method further comprising: generating an access credential for accessing the storage resource on the first cluster of compute nodes; and sending the access credential to the second operator component to permit the cache resource provisioned on the second cluster of compute nodes to access the storage resource provisioned on the first cluster of compute nodes.

In accordance with a 26th example aspect of the present disclosure, which may be used in combination with any one or more of other aspects described herein (e.g., the 20th aspect), further comprising: sending the second request to a first cluster resource delegate executing on the first operator component, wherein the first cluster resource delegate is configured to modify the second request to correspond to a second API specific to the first operator component associated with the first cluster of compute nodes; and sending the second request to a second cluster resource delegate executing on the second operator component, wherein the second cluster resource delegate is configured to modify the third request to correspond to a third API specific to the second operator component associated with the second cluster of compute nodes.

In accordance with a 27th example aspect of the present disclosure, which may be used in combination with any one or more of other aspects described herein (e.g., the 20th aspect), further comprising: sending, by the federated operator component, a fourth request to provision persistent storage for the compute service at a cluster of compute nodes associated with a regional or centralized data center; and sending, by the federated operator component, a fifth request to provision cache for the compute service at an edge data center located proximately to users of the compute service.

Aspects of the subject matter described herein may be useful alone or in combination with one or more other aspects described herein. In a 28th example aspect of the present disclosure, a system comprises: a means for receiving an application programming interface (API) declaration of a compute service, the API declaration comprising specification of at least a first compute resource for the compute service and a second compute resource for the compute service; a means for receiving a request to provision the first compute resource on a first container orchestration framework of a first cluster of compute nodes; a means to provision one or more containers to provide the first compute resource on the first cluster of compute nodes; a means for receiving a request to provision the second compute resource on a second container orchestration framework of a second cluster of compute nodes; and a means to provision one or more containers to provide the second compute resource on the second cluster of compute nodes.

In accordance with a 29th example aspect of the present disclosure, which may be used in combination with any one or more of other aspects described herein (e.g., the 28th aspect), the system comprising a means for generating an access credential to enable the first cluster of compute nodes to communicate with the second cluster of compute noes.

In accordance with a 30th example aspect of the present disclosure, which may be used in combination with any one or more of other aspects described herein (e.g., the 28th aspect), the system comprising a means for providing a connectivity map defining a mesh network comprising routing destinations for compute services provided by the first cluster of compute nodes and the second cluster of compute nodes.

Aspects of the subject matter described herein may be useful alone or in combination with one or more other aspects described herein. In a 31st example aspect of the present disclosure, a non-transitory computer-readable storage medium stores executable instructions that, when executed by a computer system, cause the computer system to: receive first instructions from a federated operator component configured in communication with a plurality of operator components, the first instructions comprising a request to provision a first compute resource for a first compute service, wherein each operator component of the plurality of operator components is associated with a respective cluster of compute nodes, and wherein the first compute service uses a second compute resource provisioned by a second cluster of compute nodes; and generate modified instructions by modifying the first instructions to correspond to an application programming interface (API) specific to the first operator component.

In accordance with a 32nd example aspect of the present disclosure, which may be used in combination with any one or more of other aspects described herein (e.g., the 31st aspect), the non-transitory computer-readable storage medium storing further instructions that, when executed by the computer system, cause the computer system to send a signed certificate received from the federated operator component to the first operator component for storage in a key store associated with the first cluster of compute nodes of the first operator component.

Aspects of the subject matter described herein may be useful alone or in combination with one or more other aspects described herein. In a 33rd example aspect of the present disclosure, a method comprises receiving first instructions from a federated operator component configured in communication with a plurality of operator components, the first instructions comprising a request to provision a first compute resource for a first compute service, wherein each operator component of the plurality of operator components is associated with a respective cluster of compute nodes, and wherein the first compute service uses a second compute resource provisioned by a second cluster of compute nodes; generating modified instructions by modifying the first instructions to correspond to an application programming interface (API) of the first operator component; and sending the modified instructions to the API of the first operator component, wherein the modified instructions are configured to cause a master node of the first container orchestration framework to instantiate one or more containers configured to provide the first compute resource for the first compute service.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A system comprising:
a memory; and
at least one processor in communication with the memory, the at least one processor configured to execute a federated operator component that is configured to:
receive an application programming interface (API) declaration specifying a compute service, a first compute resource requirement for the compute service, and a second compute resource requirement for the compute service;

determine at least a first hierarchical level and a second hierarchical level of an edge computing network, the second hierarchical level being at least one hierarchical level higher than the first hierarchical level, such that wherein the first hierarchical level is deployed at an edge proximate to a consumer of the compute service and the second hierarchical level is regionally or centrally located relative to the edge;

select the first hierarchical level for provisioning a first compute resource based on the first compute resource requirement;

send a first request to provision the first compute resource to a first operator component executing on a first container orchestration framework of a first cluster of compute nodes, wherein the first cluster of compute nodes is associated with the first hierarchical level, wherein the first request to provision the first compute resource is sent to a first cluster resource delegate of the first operator component, wherein the first cluster resource delegate is configured to transform the first request into first instructions that are associated with a first API of the first operator component and that are configured to cause the first container orchestration framework to provision the first compute resource on the first cluster of compute nodes;

select the second hierarchical level for provisioning a second compute resource according to the second compute resource requirement;

send a second request to provision the second compute to a second operator component executing on a second container orchestration framework of a second cluster of compute nodes, wherein the second cluster of compute nodes is associated with the second hierarchical level of the computing network; and provision the first and second compute resources.

2. The system of claim 1, wherein the federated operator component sends a signed security certificate to the first cluster of compute nodes and to the second cluster of compute nodes, wherein the signed security certificate enables encrypted communication between the first cluster of compute nodes and the second cluster of compute nodes.

3. The system of claim 1, wherein the compute service comprises a content delivery network, and the first request to provision the first compute resource comprises a cache specification for the content delivery network, and wherein the second request to provision the second compute resource comprises a storage specification for the content delivery network.

4. The system of claim 1, wherein the first compute resource comprises a cache resource, the first cluster of compute nodes comprise edge compute nodes, the second compute resource comprises a storage resource, and the second cluster of compute nodes comprise centralized or regional compute nodes.

5. The system of claim 1, wherein the federated operator component generates a connectivity map defining a mesh network comprising routing destinations for compute services provided by the first cluster of compute nodes and the second cluster of compute nodes.

6. The system of claim 1, wherein the federated operator component is further effective to:

determine that the first cluster of compute nodes is unable to provide the first compute resource; and send a third request to provision the first compute resource to the second operator component, wherein the third request is configured to cause the second operator component to provision the first compute resource on one or more compute nodes of the second cluster of compute nodes.

7. The system of claim 1, wherein the first request comprises a first service level requirement for provisioning the first compute resource for the compute service, and wherein a reconciler component associated with the first operator component is effective to provision the first compute resource on compute nodes of the first cluster of compute nodes that are able to satisfy the first service level requirement.

8. The system of claim 1, wherein the first request for the first compute resource comprises a request to provision a first amount of cache and the second request for the second compute resource comprises a request to provision a second amount of cache, the federated operator component further configured to:

determine that the first cluster of compute nodes is deficient in providing the first amount of cache by a first deficiency amount that is less than the first amount of cache; and send a third request to provision the first deficiency amount to a third operator component executing on a third container orchestration framework of a third cluster of compute nodes while the first cluster of compute nodes continues to provide a second amount of cache that is a difference between the first amount and the first deficiency amount.

9. The system of claim 1, wherein the federated operator component is further configured to:

determine that the first cluster of compute nodes is deficient in providing the first compute resource;

send a third request to provision the first compute resource to a third operator component executing on a third container orchestration framework of a third cluster of compute nodes; and update a routing table to route requests for the third compute resource to an appropriate address of the third cluster of compute nodes.

10. The system of claim 1, wherein:

the federated operator component sends the second request to a second cluster resource delegate, the second cluster resource delegate configured to transform the second request to a second series of executable instructions executable by the second operator component and effective to cause the second operator component to provision the second compute resource on the second cluster of compute nodes.

11. The system of claim 1, wherein the federated operator component is further configured to:

schedule a first system upgrade for the first cluster of compute nodes, wherein the first compute resource provided by the first cluster of compute nodes comprises a persistent storage resource; and schedule a second system upgrade for the second cluster of compute nodes, wherein the second compute resource provided by the second cluster of compute nodes comprises a cache resource, and wherein the second system upgrade is scheduled to begin following completion of the first system upgrade.

12. A system comprising:
a memory;
at least one processor in communication with the memory;
a first operator component associated with a first container orchestration framework of a first cluster of compute nodes, the first operator component configured to:
receive an application programming interface (API) declaration specifying a compute service and a first compute resource requirement for the compute service;
determine at least a first hierarchical level and a second hierarchical level of an edge computing network, the second hierarchical level being at least one hierarchical level higher than the first hierarchical level, wherein the first hierarchical level is deployed at an edge proximate to a consumer of the compute service and the second hierarchical level is regionally or centrally located relative to the edge; and
select the first hierarchical level for provisioning a first compute resource based on the first compute resource requirement;
a first cluster resource delegate associated with the first cluster of compute nodes, wherein the first cluster resource delegate is configured to:
receive first instructions from the federated operator component configured in communication with a plurality of operator components, the first instructions comprising a request to provision the first compute resource for the first compute service, wherein each operator component of the plurality of operator components is associated with a respective cluster of compute nodes, and wherein the first compute service uses a second compute resource provisioned by a second cluster of compute nodes; and
generate modified instructions by modifying the first instructions to correspond to an application programming interface (API) specific to the first operator component;
the first operator component effective to:
receive, at the API, the modified instructions;
send second instructions to a master node of the first container orchestration framework to instantiate one or more containers configured to provide the first compute resource for the first compute service based on the modified instructions; and
provision the first compute resource.

13. The system of claim 12, wherein the first cluster resource delegate is further configured to send data to the federated operator component, the data indicating at least one of a network address or a network port associated with the first compute resource.

14. The system of claim 12, wherein a signed certificate is received by the first cluster resource delegate from the federated operator component, wherein the first cluster resource delegate is further configured to:
send the signed certificate to the first operator component for storage in a key store associated with the first cluster of compute nodes.

15. The system of claim 12, further comprising:
a second operator component associated with a second container orchestration framework of a second cluster of compute nodes; and
a second cluster resource delegate associated with the second cluster of compute nodes, wherein the second cluster resource delegate is configured to:
receive second instructions from the federated operator component, the second instructions comprising a request to provision a second compute resource for the first compute service by the second cluster of compute nodes.

16. The system of claim 15, wherein the second cluster resource delegate is further configured to generate modified second instructions by modifying the second instructions to correspond to an application programming interface (API) specific to the second operator component.

17. The system of claim 15, wherein the second cluster resource delegate is further configured to:
receive second instructions from the federated operator component, the second instructions comprising a request to modify the first compute resource provisioned by the first cluster of compute nodes for the first compute service, wherein the request to modify the first compute resource is generated by the federated operator component based at least in part on a rebalancing of the first compute service by the federated operator component; and
generate second modified instructions by modifying the second instructions to correspond to the API specific to the first operator component.

18. The system of claim 17, wherein the first operator component is effective to:
receive, at the API, the modified second instructions; and
send instructions to the master node of the first container orchestration framework to rebalance the one or more containers based on the modified instructions.

19. A method of providing a compute service, comprising:
receiving, at a first application programming interface (API) of a federated operator component, a first request to deploy a compute service;
determining at least a first hierarchical level and a second hierarchical level of a computing network, the second hierarchical level being at least one hierarchical level higher than the first hierarchical level, wherein the first hierarchical level is deployed at an edge proximate to a consumer of the compute service and the second hierarchical level is regionally or centrally located relative to the edge;
selecting the first hierarchical level for provisioning a first compute resource of the compute service based on a first compute resource requirement;
sending, by a federated operator component to a first operator component associated with a first cluster of compute nodes, a second request to provision a first compute resource for the compute service among the first cluster of compute nodes, wherein the first cluster of compute nodes is associated with the first hierarchical level, wherein the first request to provision the first compute resource is sent to a first cluster resource delegate of the first operator component, wherein the first cluster resource delegate is configured to transform the first request into first instructions that are associated with a first API of the first operator component and that are configured to cause the first container orchestration framework to provision the first compute resource on the first cluster of compute nodes;
selecting the second hierarchical level for provisioning a second compute resource according to a second compute resource requirement;
sending, by the federated operator component to a second operator component associated with a second cluster of compute nodes, a third request to provision the second compute resource for the compute service among the second cluster of compute nodes, wherein the second cluster of compute nodes is associated with the second hierarchical level; and
provisioning the first and second compute resources.

* * * * *